United States Patent [19]

McWithey et al.

[11] 4,411,380

[45] Oct. 25, 1983

[54] METAL MATRIX COMPOSITE STRUCTURAL PANEL CONSTRUCTION

[75] Inventors: Robert R. McWithey, Newport News; Dick M. Royster, Hampton; Thomas T. Bales, Newport News, all of Va.

[73] Assignee: The United States of America as represented by the Administrator of the National Aeronautics and Space Administration, Washington, D.C.

[21] Appl. No.: 280,155

[22] Filed: Jun. 30, 1981

[51] Int. Cl.³ .......................... B23K 1/04; B32B 3/12
[52] U.S. Cl. ..................................... 228/181; 52/806; 52/808; 228/157; 228/212; 244/119; 244/123; 428/593
[58] Field of Search ............... 423/593; 244/123, 119; 52/806, 808; 228/157, 181, 212

[56] References Cited

U.S. PATENT DOCUMENTS 3,020,946 2/1962 Kirk et al. .......................... 244/123
3,084,770 4/1963 Wirsing, Jr. ........................ 52/806
3,388,522 6/1968 Lowes ................................ 244/123
3,401,025 9/1968 Whitney .............................. 52/806

OTHER PUBLICATIONS

NASA TP-1573.
NASA TP-1269.

*Primary Examiner*—Brooks H. Hunt
*Assistant Examiner*—Joel P. Okamoto
*Attorney, Agent, or Firm*—Howard J. Osborn; John R. Manning; Wallace J. Nelson

[57] ABSTRACT

Lightweight capped honeycomb stiffeners 18 for use in fabricating metal or metal/matrix exterior structural panels 14 on aerospace type vehicles 10 and the process for fabricating same are disclosed. The stiffener stringers are formed in sheets (FIG. 6), cut to the desired width and length and brazed in spaced relationship to a skin 16 (FIG. 2) with the honeycomb material serving directly as the required lightweight stiffeners and not requiring separate metal encasement for the exposed honeycomb cells.

6 Claims, 6 Drawing Figures

METAL MATRIX COMPOSITE STRUCTURAL PANEL CONSTRUCTION

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to the development of lightweight, structurally efficient, and low cost honeycomb stiffened metal matrix composite structural panels that are specifically applicable to aircraft, missiles, spacecraft and the like. In recent years, the rapidly increasing cost and limited supplies of fuel has accentuated the need for stronger lightweight aerospace vehicular structures. Metal-matrix composites are one class of materials that exhibit high ratios of stiffness and strength to density ratios that appear particularly applicable for these advanced aerospace structures and researchers are expending vast sums of money and time into developing improved structural panels from these materials. The primary purposes of a stiffener on a panel or sheet are to prevent buckling of the sheet when in compression and to add bending stiffness to the sheet under lateral loads. A structurally efficient sheet stiffener structure is obtained when the material in the cross-section of the structure is distributed such that the load carrying capability of the configuration is a maximum.

PRIOR ART

Cellular honeycomb cores attached to thin structural skin layers have been employed as sandwich panels in construction of aircraft structural panels in some instances. Also, the use of complex panel frameworks utilizing spars, bulkheads, doublers, trusses, and the like attached to skins of relatively heavy gauge metal with pluralities of stringer type stiffeners are well known expedients in the art. Where stringers have been employed they usually are of solid relatively heavy metal construction or lightweight materials completely encased in heavy metal of the hat-type configuration. The weight penalities necessary in these prior art construction techniques to achieve the desired structural properties are immense and there remains a definite need in the art for improved lightweight structural panels that possess adequate physical property characteristics for use in aerospace vehicles capable of supersonic and hypersonic flight regimes.

It is therefore an object of the present invention to provide an improved metal matrix composite structural panel for use in aerospace vehicular construction.

Another object of the present invention is an improved process for making lightweight structural panels.

Another object of the present invention is an improved stringer construction for use in assembling lightweight, high strength structural panels.

A further object of the present invention is a novel process for constructing stringer reinforced metal-matrix structural panels.

Another object of the present invention is a novel stringer for use in structural panel construction.

An additional object of the present invention is a novel process for making a structurally efficient stringer stiffener for use in structural panel fabrication.

BRIEF DESCRIPTION OF THE INVENTION

According to the present invention, the foregoing and additional objects are attained by brazing large sheets of a cap material to one open cell side of a honeycomb core material having the desired core height, cutting individual stringers from this brazed structure of the desired width and length and brazing the remaining open end of the capped honeycomb stringer to a sheet of material designed to form the skin layer of the panel being fabricated. A plurality of stringers spaced at the desired width distance may be simultaneously brazed to the panel skin in a conventional manner.

A more complete appreciation of the invention and many of the attendant advantages thereof will become more readily apparent as the same becomes better understood by reference to the following detailed description when considered in connection with the accompanying drawing wherein.

DETAILED DESCRIPTION OF THE INVENTION

Figure 1:
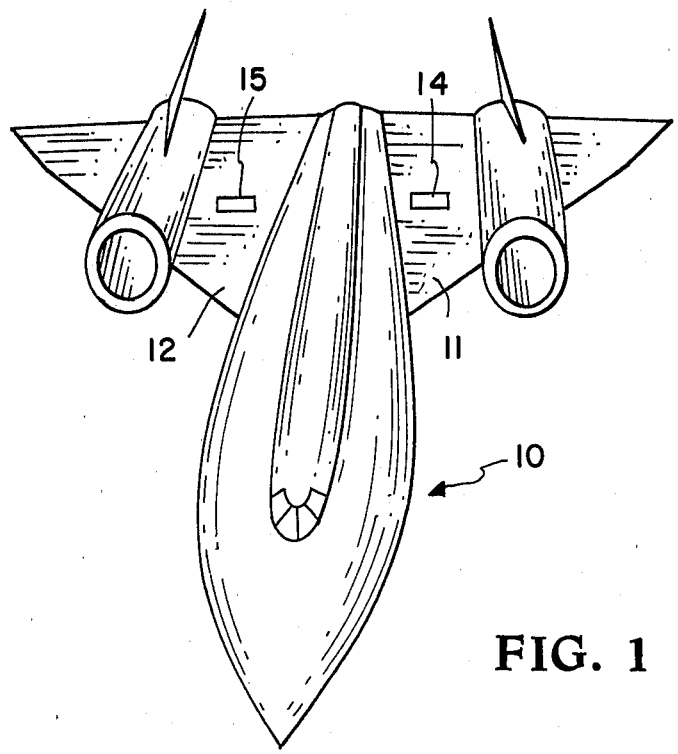
FIG. 1 is a perspective view of an exemplary aircraft with a typical wing panel shown outlined thereon and constructed in accordance with the present invention.

Referring now to the drawings, and more particularly to FIG. 1, there is shown an exemplary aircraft 10 having wings 11 and 12. The upper surfaces of wings 11 and 12 are formed of a plurality of structural panels that may be constructed according to the present invention. Two such panels are outlined in FIG. 1 and designated by reference numerals 14 and 15. For reasons of clarity only one such panel 14 will be described herein and it is to be understood and recognized that each panel forming the surfaces of wings 11 and 12, whether flat or contoured, would be constructed in the same manner as that described hereinafter for panel 14.

Figure 2:
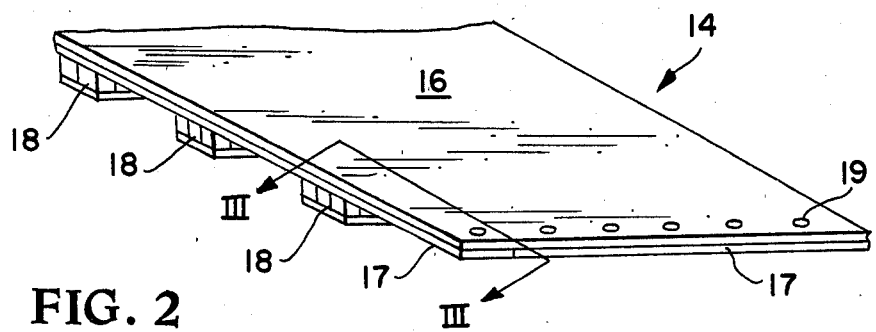
FIG. 2 is an enlarged illustrative view of a segment of the wing panel shown in FIG. 1.
Figure 3:
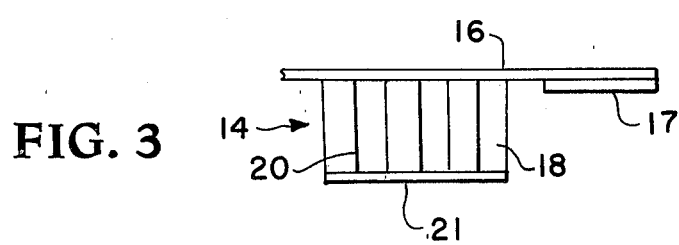
FIG. 3 is a sectional view of a segment of the panel taken along line III—III of FIG. 2.

Referring now to FIG. 2, a segment of panel 14 is shown wherein it is seen that panel 14 is constructed of a skin 16 and a plurality of spaced stiffner stringers 18. As shown more particularly in FIG. 3, each stiffner 18 includes honeycomb core material 20 having the open end of the individual cells disposed against and secured by brazing to skin 16 and a metal cap layer 21 brazed to and sealing the other end of the honeycomb core cells. The sidewall portions of the honeycomb core remains exposed as will be further explained hereinafter. The honeycomb core material is commercially available from various manufacturers and is selected to be of the desired core height and density. In the specific embodiment described herein the honeycomb cells were 0.90 inch in height and the entire core constructed of titanium foil. The honeycomb as received from the manufacturer, had a density of 9.5 lbm/ft³. (purchased from Aeronca, Inc. Middletown, Ohio).

Figure 4:
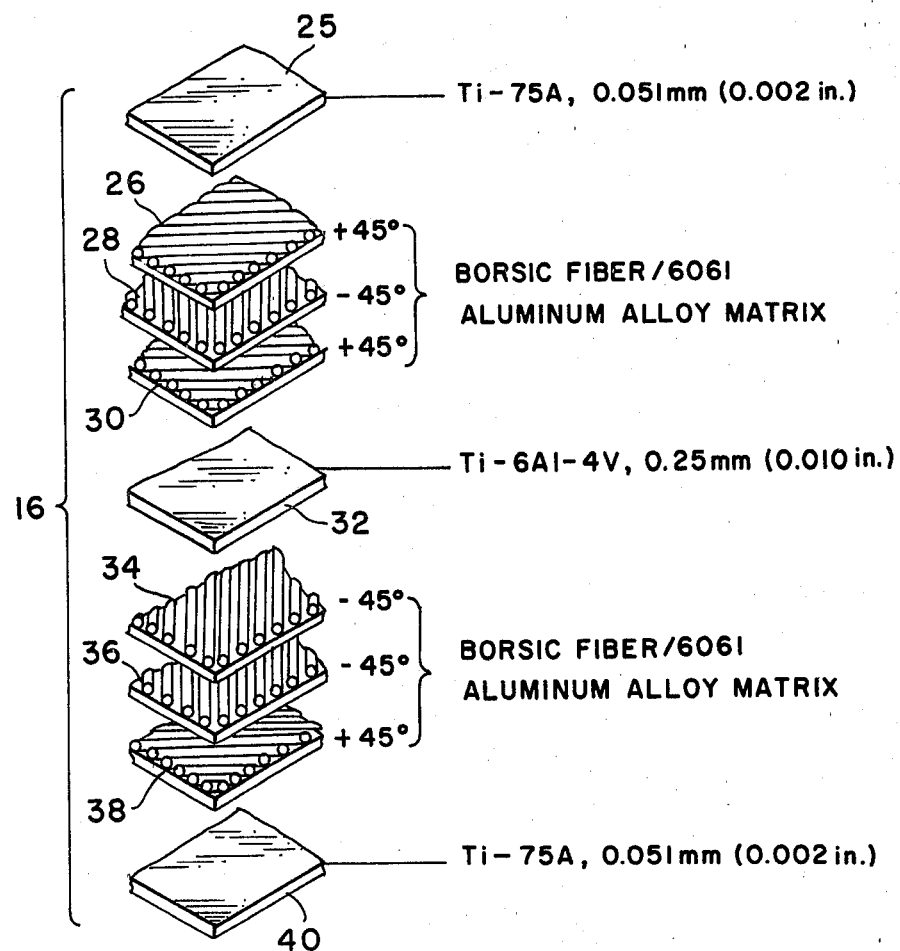
FIG. 4 is an exploded view of an exemplary skin material used in the construction of the panel according to the present invention.

Referring now to FIG. 4 the details of a specific exemplary skin layer 16 is a laminate sandwich construction provided with an outer layer 25 of titanium (Ti-75A) (manufactured by Timet, 400 Rouser Road, Pittsburgh, Pennsylvania 15230) of 0.002 inch thickness; three layers 26, 28, and 30 of 0.0057 inch diameter Borsic fiber/6061 aluminum alloy matrix with the Borsic fiber orientation therein being $+45°$, $-45°$, and $+45°$, respectively, as shown in the drawing; (Boric is the registered tradename of United Aircraft Products, Inc. for the silicon coated boron fibers used in the specific examples described herein) a layer 32 of the titanium alloy Ti-6Al-4V of 0.010 inch thickness; three additional layers 34, 36, 38 of 0.0057 inch diameter of the Borsic fiber/6061 aluminum alloy matrix and having the Borsic fiber orientation of $-45°$, $-45°$, and $+45°$, respectively; and a final layer 40 of titanium (Ti-75A).

This titanium-clad Borsic/aluminum skin 16 fabrication is more completely described in the inventors' prior publication NASA TP-1573, March 1980, which is incorporated herein by reference. As discussed in this publication, initial studies reported that the properties of boron/aluminum (B/Al) were degraded after exposure to temperatures above 811 K. (1000° F.). Silicon particles diffusing from the braze alloy into the aluminum matrix embrittle both the boron fiber and aluminum matrix. In contrast, when the boron fiber was coated with a thin layer of silicon carbide, the physical properties of the coated fiber/aluminum remain unaffected after exposure at a temperature of 866 K. (1000° F.) for one hour. A successful brazing process for fabricating a titanium-clad Borsic/Al structural panel is described in the reference publication and utilized a pure titanium foil cladding on the surface of the Borsic/aluminum sheet material. This prior work demonstrated that the titanium cladding eliminated composite/braze interaction and led to the development of the present invention.

Figure 5:
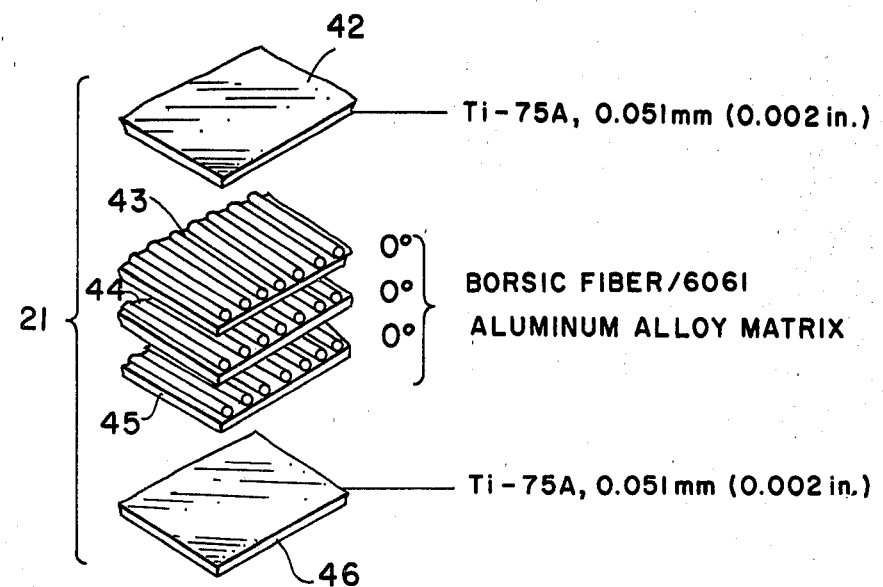
FIG. 5 is an exploded view of the cap material used for the individual stringers shown in the panel of FIGS. 1-3.

Referring now to FIG. 5, the details of cap 21 for stringers 18 will now be described. As shown therein cap 21 is also a laminate sandwich construction and includes a layer 42 of titanium (Ti-75A) of 0.002 inch thickness; three layers 43, 44, 45 of 0.0057 inch diameter Borsic fiber/6061 aluminum alloy matrix with each layer of the boron fibers being orientated at 0° as illustrated in the drawing and a final layer 46 of 0.002 inch thick titanium (Ti-75A).

Figure 6:
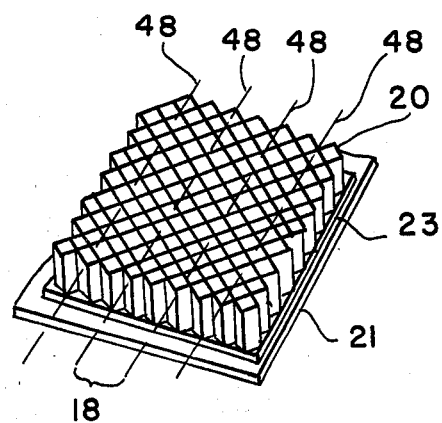
FIG. 6 is a view of a cellular honeycomb material positioned for brazing to a sheet of cap material prior to being cut into individual stringers.

The fabrication of the individual stringers 18 is best described by reference to FIG. 6. As shown therein a relatively large area of the titanium honeycomb core material 20 as received from the manufacturer is positioned on a titanium sheet 21 as described in reference to FIG. 5 and with a braze alloy sheet 23 of 0.010 inch thickness disposed therebetween. The braze alloy employed in the specific examples described herein was No. 718 aluminum braze alloy, a product of Aluminum Company of America and designated at 4047 by the Aluminum Association and as BalSi-4 by AWS-ASTM. This assembly is then brazed into a unitary structure by conventional brazing temperature and pressure and cut into individual stringers 18 of the desired width by electrical discharge machining or the like as indicated by the broken lines 48 in FIG. 6. These individual stringers are then brazed to skin 16 (along the open cell surfaces) in a subsequent braze operation again utilizing 718 aluminum alloy as the braze material.

In a specific example, twelve stringers (sixteen inches long and 0.95 inch wide) were equally spaced 1.23 inches apart along a twenty-eight inch skin 16 having a thickness of 0.057 inches. The honeycomb-core was 0.90 inch in height and cap 21 was of 0.025 inch thickness. The border perimeter of panel 14 was reinforced with titanium alloy doublers approximately (one inch wide) to facilitate attachment of the panel to aircraft 10 substructure (not shown). More specific details of the stringer fabrication process follows below.

Stringer fabrication involved several individual operations. The Ti-3Al-2.5V titanium alloy honeycomb selected for the specific examples described herein was purchased from Aeronca, Inc., Middletown, Ohio and had a premachined height of 0.90 inch and a density of 9.5 lb/ft³. A segment 14×28 inches was electrical discharge machined from the stock received and immersed in a conventional nitric-hydrofluoric acid solution to chemically clean the surface for brazing. After cleaning, the honeycomb- core was placed on a 0.020 inch thick sheet of 3004 aluminum braze alloy and both positioned between platens coated with a graphite stop off material to "prewet" the core for braze alloy management. This entire assembly was then placed in a vacuum furnace and heated to and maintained at a temperature of 1250° F. and 1.33 mPa ($1 \times 10^{-5}$ torr) pressure for ten minutes. After cooling, visual inspection of the brazed assembly indicated that the aluminum alloy material has been drawn up into the nodes of the honey-comb core by capillary action as it melted to "prewet" the nodal areas with the braze alloy. Following visual inspection, the prewet core was vapor degreased. Chemically cleaned, 0.025 inch thick, 3-ply unidirectional Ti-clad Bsc/Al sheet and an intermediate sheet of chemically cleaned 0.010 inch thick 718 aluminum braze alloy were then positioned on the prewet core. This assembly was again positioned between brazing platens and vacuum brazed at a temperature of 1095° F. and 1.33 mPa ($1 \times 10^{-5}$ torr) pressure for 3 minutes. After cooling, the individual stringers 18 were cut from the brazed assembly using electrical discharge machining.

Prior to assemblying the panel components for brazing, the Ti-clad skin and titanium alloy doublers were chemically cleaned and the individual stringers were vapor degreased as described before. A sheet of the Ti-clad Bsc/Al skin 0.057 inch thick was positioned on a lower brazing platen using an alignment tool consisting of ground and machined flat bar stock secured to the lower platen in position such that the bar edges define the perimeter of the panel to be fabricated. The 718 aluminum braze alloy foil strips and Ti-6Al-4V alloy doublers were positioned on the skin the butted against the alignment tool. The doublers extended around the perimeter of the panel skin and were held in position by spot-welding titanium tie straps to both the doublers and the skin layer. By using the edge alignment bars as a reference, the individual spaced stringers and an associated braze alloy strip for each stringer were located on the skin with the aid of vernier calipers. The spaced stringer position was maintained by spot-welding titanium foil tie straps to the individual stringers and the skin material.

The braze tooling used to maintain contact between facing surfaces during brazing consisted of a network of titanium capped titanium honeycomb-core crossmembers, a stainless steel pressure bladder and lower and upper platens. The crossmembers were fabricated similar to the above described panel stiffener fabrication with a sheet 13 by 14 by 0.032 inch Ti-6Al-4V alloy brazed to an equal size slab of 4.5 lbm/ft³ titanium honeycomb-core with 3004 aluminum braze alloy. Individual crossmembers approximately one inch wide were cut from this assembly and the corners of each crossmember chamfered at an angle of approximately 45° to avoid contact with the braze alloy strips used to join the panel stringers to the skin. Individual capped honeycomb-core tooling edge members were brazed and sized to fit over the doublers around the perimeter of the panel. After brazing and sizing of the individual components, the tooling was assembled into a single unit by drilling and pinning the edge members to the crossmembers which were spaced so as to nest between the panel stringers against the composite skin. The tooling was sized so that when positioned on the assembled panel, tooling and stringer heights were equal to the caps of the tooling and the open cells of the springers provided a flat, semicontinuous plane parallel to the composite skin 16.

After the capped honeycomb core tooling was positioned on the assembled panel components, a 0.020 inch thick Ti-6Al-4V titanium alloy slip sheet was placed on the caps of the tooling crossmembers and stiffeners. The upper brazing platen having the stainless steel pressure bladder attached to and suspended therefrom was then lowered in place over the skin-stringer assembly, the upper and lower platens bolted together and the entire assembly placed in a vacuum furnace. The furnace employed was a Abar Vacuum Furnace capable of two-rate, two-soak programmed resistance heating as well as closed recirculating inert-gas programmed cooling.

Following evacuation of the vacuum furnace to a pressure of 133 μPa, ($1 \times 10^{-6}$ torr) the assembly was heated to and maintained at a temperature of 839 K. (1050° F.) for ten minutes to establish thermal equilibrium prior to heating to the brazing temperature of 864 K. (1095° F.). Proper contact between mating parts was maintained during brazing by pressurizing the stainless steel bladder with helium to 13.8 kPa (2 psi). When the skin temperature (monitored by eight thermocouples positioned at spaced locations on the skin) reached 864 K. power to the furnace heating elements was turned off and the helium inert gas cooling system activated to cool the panel to approximately 839 K. in approximately ten minutes. Gas cooling was discontinued and the panel was permitted to furnace-cool to ambient temperature.

Thermal exposure of the composite material during brazing was minimized by the combination of prewet honeycomb core, lightweight honeycomb core tooling, inert gas cooling and the 718 Aluminum braze alloy. Fabrication of the panel was completed by trimming the panel to size with a diamond-impregnated wheel and drilling holes 19 with conventional high speed drills along the periphery. The average mass of the finished Ti-clad Bsc/Al panels fabricated as described was 2.73 kg (6.02 lbm) which represented a mass savings of thirty percent compared to original titanium structural panels employing conventional stringer stiffeners.

Panels constructed in accordance with the above described process have been subjected to both nondestructive evaluation tests including thermal exposure during supersonic cruise as a structural panel on an experimental aircraft, and various conventional tensile, shear, and compression tests to failure with the final test results documented far exceeding the design ultimate in all instances.

It is thus seen that the present invention provides a new and novel lightweight, high-strength, structural panel and fabrication technique for producing same. Although the specific examples have been described relative to metal matrix composite skin material, any conventional metal used for aircraft skin panel construction could obviously be employed with the specific lightweight honeycomb stringers of the present invention. Also, although the specific examples described are for flat rectangle panels, any required shape and curvature may be constructed in the panel by the present process by selecting the appropriate curvature for the platens employed. Also, although the use of specific materials are set forth for each component of the exemplary example described herein and specific times, temperatures, pressures, etc., in the process, the invention is not so limited and numerous variations therein will be readily apparent to those skilled in the art in the light of the foregoing teachings without departing from the spirit or scope of the invention as set forth in the appended claims. It is therefore to be understood that the invention may be practiced otherwise than as specifically described.

What is claimed as new and desired to be secured by Letters Patent of the United States is:

1. A method of fabricating lightweight structural panels suitable for use in aerospace vehicular construction comprising:
   providing a metal exterior skin for the structural panel,
   brazing doublers along the interior periphery of the exterior skin with the doublers being of the same composition and of essentially the same thickness as the exterior skin,
   brazing a plurality of equally spaced parallel honeycomb stringers along the interior surface of the exterior skin with one end surface of the honeycomb stringers being confined within the area defined by the doublers and the other end of each honeycomb stringer being capped so as to leave the honeycomb cell sidewalls exposed; and
   wherein the metal exterior skin is a metal matrix composite laminate sandwich construction having a first layer of titanium, three adjacent layers of silicon carbide coated boron fibers embedded within an aluminum alloy matrix, an intermediate layer of Ti-6Al-4V titanium alloy, three additional layers of silicon coated boron fibers embedded within an aluminum alloy matrix, and a second layer of titanium.

2. The method of claim 1 wherein the doublers are constructed from Ti-6Al-4V titanium alloy and are of essentially the same width as the stringer stiffeners.

3. A method of making elongated stringer stiffeners for use in fabricating lightweight structural panels and the like comprising the steps of:
   providing a honeycomb core material constructed of a titanium alloy,
   chemically cleaning the honeycomb core by immersion in a nitric-hydrofluoric acid solution,
   positioning the cleaned honeycomb core with one end of the open cells thereof in contact with a sheet of 3004 aluminum braze alloy,
   heating the honeycomb core and braze alloy to a temperature of 1250° F. and a pressure of 1.33 mPa ($1 \times 10^{-5}$ torr) for ten minutes to cause the braze alloy to melt and prewet the honeycomb core nodes therewith due to capillary action, providing a titanium-clad, silicon-carbide coated boron fiber/aluminum alloy matrix laminate sheet, positioning a 718 aluminum braze alloy sheet between and in contact with the prewet honeycomb core and the titanium-clad laminate sheet, vacuum brazing this assembly into a unitary mass at a temperature of 1095° F. and a pressure of 1.33 mPa ($1 \times 10^{-5}$ torr) for three minutes to provide a cap for the honeycomb core, and cooling the brazed assembly and cutting individual elongated stringer stiffeners of the desired width from the capped honeycomb along a length of the unitary brazed mass.

4. The method of claim 3 wherein the honeycomb core is a Ti-3Al-2.5V titanium alloy and has a premachined height of 0.90 inch and a density of 9.5 lbm/ft$^3$.

5. The method of claim 3 wherein the sheet of 3004 aluminum braze alloy employed is 0.020 inch thick and the sheet of 718 aluminum braze alloy is 0.010 inch thick.

6. The method of claim 3 wherein the titanium-clad silicon carbide coated boron fiber/aluminum alloy matrix laminate sheet consists of a pair of outer layers of Ti-75A of 0.002 inch thickness sandwiching therebetween a three-ply assembly with each ply consisting of silicon carbide coated unidirectional boron fibers embedded within an aluminum alloy matrix.

* * * * *